(12) United States Patent
Shimoyama et al.

(10) Patent No.: US 6,909,596 B2
(45) Date of Patent: Jun. 21, 2005

(54) SOLID ELECTROLYTIC CAPACITOR AND METHOD OF MANUFACTURING THE SAME

(75) Inventors: Koji Shimoyama, Itami (JP); Yuji Mido, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/877,423

(22) Filed: Jun. 25, 2004

(65) Prior Publication Data

US 2004/0264111 A1 Dec. 30, 2004

(30) Foreign Application Priority Data

Jun. 30, 2003 (JP) ........................................ 2003-186813

(51) Int. Cl.[7] .................................................. H01G 9/00
(52) U.S. Cl. ........................ 361/523; 361/528; 361/532; 29/25.03
(58) Field of Search ................................. 361/523, 524, 361/528–529, 532, 535; 29/25.03

(56) References Cited

U.S. PATENT DOCUMENTS 5,621,608 A * 4/1997 Arai et al. ................. 361/525
6,392,869 B2 * 5/2002 Shiraishi et al. ............ 361/523
6,563,693 B2 * 5/2003 Nakada et al. .............. 361/523

FOREIGN PATENT DOCUMENTS

| JP | 2000-049048 A | 2/2000 |
|----|---------------|--------|
| JP | 2000-068158 A | 3/2000 |

* cited by examiner

Primary Examiner—Anthony Dinkins
(74) Attorney, Agent, or Firm—RatnerPrestia

(57) ABSTRACT

A capacitor element includes a valve metal foil including a core layer and a porous layer on the core layer, a dielectric layer on a portion of the valve metal foil excluding an end portion of the valve metal foil, a solid electrolyte layer on the dielectric layer, a collector layer on the solid electrolyte layer, and a zinc layer on the end portion of the valve metal foil. A solid electrolytic capacitor includes the capacitor element, an insulating case for sealing the capacitor element as to expose the zinc layer, a nickel layer on the zinc layer, and an electrode provided on the case and electrically connected to the collector layer. The solid electrolytic capacitor has a small impedance even at high frequencies, and has a small overall size and a large capacitance.

25 Claims, 7 Drawing Sheets

Fig. 2

| Sample No. | Thickness Of Al Foil (um) | S1/S2 | Zn Layer/ Ni Layer | Before Heat Cycle Test | | After Heat Cycle Test | |
|---|---|---|---|---|---|---|---|
| | | | | Capacitance (μF) | ESR (mΩ) | Capacitance (μF) | ESR (mΩ) |
| Example 1 | 70 | 1/2 | Yes | 20 | 25 | 20 | 29 |
| Example 2 | 100 | 1/2 | Yes | 30 | 22 | 30 | 26 |
| Comparative Example 1 | 100 | 1/2 | None | 30 | 22 | *N/A | *N/A |
| Example 3 | 180 | 1/2 | Yes | 30 | 12 | 30 | 15 |
| Example 4 | 200 | 1/2 | Yes | 58 | 10 | 58 | 13 |
| Comparative Example 2 | 200 | 1/2 | None | 60 | 10 | *N/A | *N/A |
| Example 5 | 250 | 1/2 | Yes | 60 | 9 | 60 | 11 |
| Comparative Example 3 | 250 | 1/2 | None | 60 | 9 | 60 | 25 |
| Example 6 | 300 | 1/2 | Yes | 88 | 7 | 88 | 9 |
| Comparative Example 4 | 300 | 1/2 | None | 88 | 7 | 88 | 20 |
| Comparative Example 5 | 100 | 1/1 | None | 30 | 22 | 30 | 50 |
| Example 7 | 100 | 1/3 | Yes | 30 | 22 | 30 | 27 |

*N/A: Not Measurable

Fig. 4

| Sample No. | Number of Capacitor Elements | Zn Layer/ Ni Layer | Before Heat Cycle Test | | After Heat Cycle Test | |
|---|---|---|---|---|---|---|
| | | | Capacitance (μF) | ESR (mΩ) | Capacitance (μF) | ESR (mΩ) |
| Example 8 | 2 | Yes | 60 | 12 | 20 | 16 |
| Example 9 | 3 | Yes | 90 | 8 | 30 | 11 |
| Example 10 | 4 | Yes | 120 | 6 | 90 | 8 |
| Comparative Example 6 | 3 | None | 90 | 12 | *N/A | *N/A |

*N/A: Not Measurable

Fig. 7

| Sample No. | Number of Capacitor Elements | Zn Layer/ Ni layer | Before Heat Cycle Test | | After Heat Cycle Test | | Humidity Test | |
|---|---|---|---|---|---|---|---|---|
| | | | Capa- citance (μF) | ESR (mΩ) | Capa- citance (μF) | ESR (mΩ) | ESR (mΩ) Before Test | ESR (mΩ) After Test |
| Example 11 | 2 | Yes | 60 | 10 | 20 | 16 | 10 | 10 |
| Example 12 | 3 | Yes | 90 | 6 | 30 | 11 | 6 | 6 |
| Example 13 | 4 | Yes | 120 | 4 | 90 | 8 | 4 | 4 |
| Comparative Example 7 | 3 | None | 90 | 6 | *N/A | *N/A | 6 | 7 |

*N/A: Not Measurable

SOLID ELECTROLYTIC CAPACITOR AND METHOD OF MANUFACTURING THE SAME

FIELD OF THE INVENTION

The present invention relates to a solid electrolytic capacitor for use in an electronic apparatus and a method of manufacturing the capacitor.

BACKGROUND OF THE INVENTION

A conventional solid electrolytic capacitor having a small size and a large capacitance is disclosed in Japanese Patent Laid-Open Publication No. 2000-49048. The capacitor includes a capacitor element having a prismatic shape and including an anode stick having an end thereof embedded in the element. The capacitor element may be manufactured by the following processes. An anode oxide layer is provided on a sintered pellet made, a core member, of valve metal powder material (tantalum powder), and then, a solid electrolyte layer of, e.g., manganese dioxide is provided on the anode oxide layer. A collector layer composed of stratified carbon and silver is provided on the solid electrolyte layer. The capacitor element is then joined with a positive electrode and a negative electrode and then enclosed together in a case. Portions of the case are removed to expose the positive electrode and the negative electrode. The case has both ends solder-plated to form terminals electrically connected with the positive electrode and the negative electrode, respectively.

Another conventional solid electrolytic capacitor is disclosed in Japanese Patent Laid-Open Publication No. 2000-68158. This capacitor includes a capacitor element having a sheet shape. A valve metal base having a dielectric oxide layer provided thereon has an end to provide an anode portion. The dielectric oxide layer is then coated with a solid electrolyte layer excluding the anode portion of the dielectric oxide layer. A collector layer functioning as a cathode portion is provided on the solid electrolyte layer, thus providing the capacitor element. The anode portion and the cathode portion have respective ends soldered or bonded with electrically conductive adhesives to lead frames. The lead frames and the capacitor elements are then coated with an outer coating, so that the lead frames are partially exposed at both ends of the outer coating. The both ends are solder plated to provide terminals electrically connected to a the anode portion and the cathode portion, respectively.

The solid electrolytic capacitor having a multi-layer structure disclosed in Publication No. 2000-68158 may be manufactured by the following processes. Plural capacitor elements having sheet shapes are stacked and fixed so that their anode portions aligned in one direction and joined to the lead frame for the positive terminal. Similarly, the cathode portions of the capacitor elements are bonded to the lead frame for the negative terminal with an electrically conductive adhesive layer, while the cathode portions flare in a direction to the anode portions, thus providing a capacitor body a multi-layer structure. The capacitor body is then enclosed in a resin coating to provide the multi-layer solid electrolytic capacitor.

The above, conventional solid electrolytic capacitors include their positive electrodes and their negative electrodes made of material different from valve metal, as provided for anode. These structures reduce volumetric sizes for providing their capacitances and increase the distances between the anode portions of valve metal to the positive electrodes. Accordingly, the capacitors have their impedances reduced for operating at high frequencies.

A solid electrolytic capacitor may have a large capacitance and a small impedance at high frequencies upon including an anode base of valve metal having an end exposed from a case to function the end as an anode portion serving as a terminal.

However, the valve metal, such as aluminum foil, may easily be coated with a thin oxide layer known as a passive layer. The solid electrolytic capacitor having the aluminum foil may hard has a small impedance since the passive layer functions as a resistor. The aluminum foil may be hardly bonded with plated regions, and thus, may have the bonding strength between the anode base and the plated regions smaller than the conventional capacitors.

The passive layer of the aluminum foil may be washed out with acid or alkali solution. The passive layer is easily developed under the atmosphere or any oxygen environment. Therefore, the passive layer can be hardly removed in either the atmosphere or solution including oxygen dissolved therein. The aluminum foil can be hardly soldered with solder (including solder without lead).

SUMMARY OF THE INVENTION

A capacitor element includes a valve metal foil including a core layer and a porous layer on the core layer, a dielectric layer on a portion of the valve metal foil excluding an end portion of the valve metal foil, a solid electrolyte layer on the dielectric layer, a collector layer on the solid electrolyte layer, and a zinc layer on the end portion of the valve metal foil. A solid electrolytic capacitor includes the capacitor element, an insulating case for sealing the capacitor element as to expose the zinc layer, a nickel layer on the zinc layer, and an electrode provided on the case and electrically connected to the collector layer.

The solid electrolytic capacitor has a small impedance even at high frequencies, and has a small overall size and a large capacitance.

BRIEF DESCRIPTION OF THE DRAWINGS

FIG. 2 illustrates characteristics of the solid electrolytic capacitor according to Embodiment 1.

FIG. 4 illustrates characteristics of the solid electrolytic capacitor according to Embodiment 2.

FIG. 7 illustrates characteristics of the solid electrolytic capacitor according to Embodiment 3.

DESCRIPTION OF THE PREFERRED EMBODIMENTS

Exemplary Embodiment 1

Figure 1:
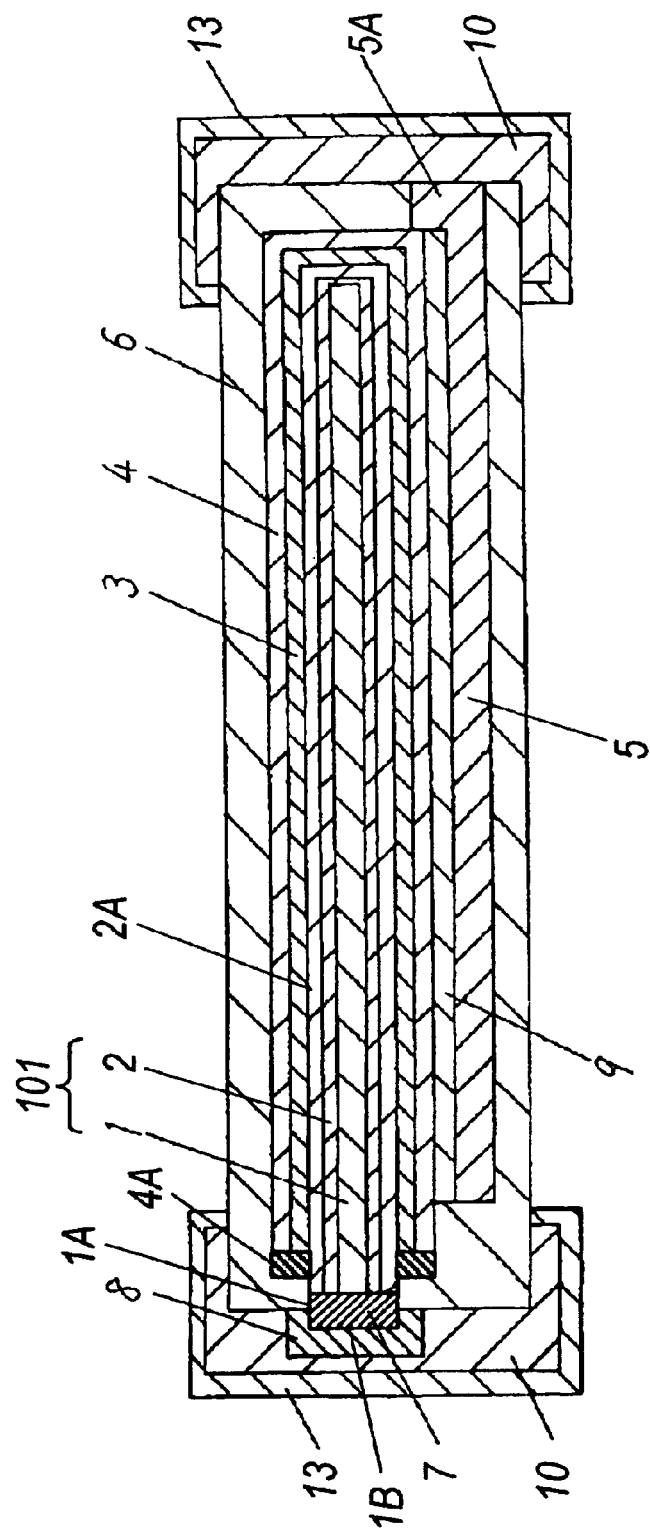
FIG. 1 is a cross sectional view of a solid electrolytic capacitor according to Exemplary Embodiment 1 of the present invention.

FIG. 1 is a cross sectional view of a solid electrolytic capacitor according to Exemplary Embodiment 1 of the present invention. A porous layer 2 is provided by, e.g., chemical etching on an aluminum layer 1, a core layer, thus providing aluminum foil 101, a porous valve metal foil. A dielectric layer 102 is provided on the porous layer 2 and then covered with a solid electrolyte layer 3 made of electrically-conductive polymer, such as polypyrrole or polythiophene, by chemical or electrolytic polymerization.

An end 1A of the aluminum layer 1 is used as an anode, hence not being covered with the solid electrolyte layer 3.

A collector layer 4 made of electrically conductive material, such as carbon or silver, is provided on the solid electrolyte layer 3. A copper foil 5 as a cathode is joined by an electrically conductive adhesive layer 9 to the solid electrolyte layer 4, thus providing a capacitor element. The capacitor element is enclosed in a case 6 made by resin molding of insulating resin material, such as epoxy resin, phenol resin, or epoxy silicone resin.

An end portion 1A of the aluminum layer 1, the porous layer 2, and the dielectric layer 102 is used as an anode, while an end surface 1B is exposed from the case 6. The dielectric layer 102 is exposed at the end portion 1A.

The copper foil 5 has an end portion 5A exposed from the case 6 for providing a cathode. The capacitor may not include the copper foil 5 and instead, may include the cathode implemented by the collector layer 4 exposed.

The case 6 is trimmed physically or chemically for exposing both the end surface 1B (of the aluminum foil 101 and the dielectric layer 102) and the end portion 5A of the copper foil 5 to provide electrodes. More specifically, the end surface 1B of the dielectric layer 102 and the aluminum foil 101 is exposed at an end of the case 6 for an anode, while the end portion 5A of the copper foil 5 is exposed at an end for a cathode.

An anode/cathode separation 4A may be provided by coating of insulating resin for electrically insulating the cathode of the solid electrolyte layer 3 and the collector layer 4 from the anode of the aluminum foil 101.

The end portion 1A exposed from the case 6 is washed with pure water and then etched with acid for removing impurities and stain from its surface. The end portion 1A is then immersed in solution of sodium hydroxide containing zinc, so that portions of the dielectric layer 102 at the anode of the aluminum layer 1 and the porous layer 2 are substituted by zinc, hence depositing a zinc layer 7. The zinc layer 7 is not only deposited on the surface of the aluminum layer 1 but also dispersed to penetrate the aluminum layer 1, hence being rigidly bonded. Zinc substitutes aluminum oxide having partial crystalline faults in a portion of the dielectric layer 102 on the porous layer 2 to deposit the zinc layer 7. Accordingly, the zinc layer 7 bonded rigidly to the whole end surface 1B of the aluminum layer 1 and the porous layer 2, i.e., the anode.

Then, the capacitor element is immersed into solution containing nickel salt and boron hydride compound, so that a nickel layer 8 is deposited on the zinc layer 7.

The nickel layer 8 and the zinc layer 7 deposited through the substitution enables the whole end surface 1B of the aluminum foil 101 to have the zinc layer 7 rigidly bonded thereto even if the aluminum foil 101 has a thickness not greater than 200 $\mu$m. This structure provides a small resistance between the zinc layer 7 and the end surface, hence allowing the solid electrolytic capacitor to have a small impedance even at high frequencies and an improved operation reliability.

A conventional capacitor including a nickel layer on an end surface of an aluminum foil allows the nickel layer to be deposited on an exposed portion of the aluminum foil. The nickel layer has a bonding strength to the aluminum foil reduced if the foil includes a thick porous layer.

The porous layer 2 of the aluminum foil 101, upon being thick, provides the solid electrolytic capacitor with a large capacitance. The capacitor according to Embodiment 1 includes the aluminum layer 2 having a thickness not larger than ½ the thickness of the porous layer 2 of the aluminum foil 101, while the bonding strength between the zinc layer 7 and the aluminum foil 101 is not reduced.

The zinc layer 7 may be provided with hydrofluoric acid or ammonium fluoride solution containing zinc instead of the zinc containing solution of sodium hydroxide.

The nickel layer 8 may be deposited with solution composed of nickel salt and diethyl amino volan instead of the nickel salt and boron hydride compound solution.

When the substitution of zinc terminates, the zinc layer 7 is stopped being deposited. The zinc layer 7 may has a thickness preferably not larger than 2 $\mu$m.

Then, the capacitor element is immersed into palladium solution and subjected to electroless plating for absorbing palladium having a catalytic effect. Then, nickel layers 10 is deposited on both end surfaces of the case 6. A tin layer 13 is provided on the nickel layer 10, thus providing the solid electrolytic capacitor having a chip form. The nickel layers 10 has a thiness ranging preferably from 1 $\mu$m to 3 $\mu$m. One of the nickel layers 10 is electrically connected to the collector layer 4 with the copper layer 5 and the conductive adhesive layer 9. The nickel layers 10 and the tin layers 13 function as electrodes for connecting the capacitor element to an external circuit. The tin layers 13 increases an affinity to solder and may be replaced by a solder layer. However, the capacitor may include the tin players 13 preferably in view of environmental protection.

The solid electrolytic capacitor according to Embodiment 1 has electrodes having lengths from the capacitor element smaller than those of the conventional solid electrolytic capacitor. Therefore, the capacitor according to the embodiment has a small impedance even at high frequencies, hence having a small equivalent series resistance (ESR) and a small equivalent series inductance (ESL). Even if the porous layer 2 of the aluminum foil 101 is thick, the solid electrolytic capacitor of Embodiment 1 has a smaller overall size and a larger capacitance than the conventional capacitors.

FIG. 2 illustrates measurements of capacitance and equivalent series resistances (ESRs) of Examples 1 to 7 of solid electrolytic capacitors including aluminum foils having various thicknesses for evaluation of the solid electrolytic capacitor of Embodiment 1. The ESRs were measured under a heat cycle test having 100 cycles in each of which an ambient temperature was changed from −40° C. to 105° C.

Comparative Examples 1 to 5 of solid electrolytic capacitors including nickel layers and tin layers on the nickel layers at both end surfaces of cases and measured in the same items. The resultant measurements are listed in FIG. 2.

As shown in FIG. 2, Examples 1 to 7 of the solid electrolytic capacitors of Embodiment 1 after the heat cycle test have ESRs smaller than those of Comparative Examples 1 to 5. The ESR of Example 7 including the aluminum layer having a cross section area S1 being ½ or smaller than a cross section area S2 of the porous layer is changed after the heat cycle test less than the Comparative Examples. Even the solid electrolytic capacitor of each Example including the aluminum foil having a thickness not greater than 200 $\mu$m exhibits a large bonding strength between the electrodes and the aluminum foil.

Exemplary Embodiment 2

Figure 3:
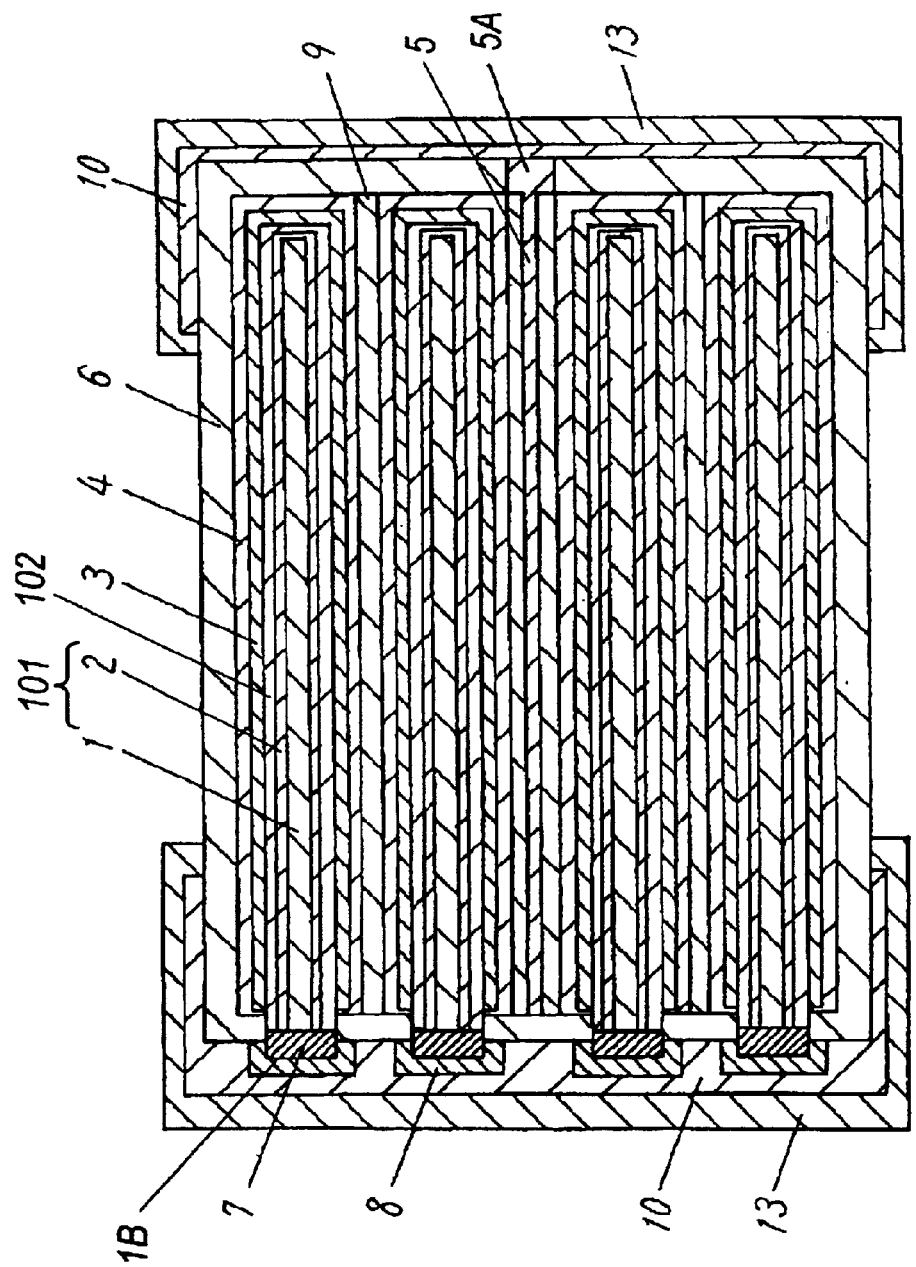
FIG. 3 is a cross sectional view of a solid electrolytic capacitor according to Exemplary Embodiment 2 of the invention.

FIG. 3 is a cross sectional view of a solid electrolytic capacitor according to exemplary Embodiment 2 of the present invention. The solid electrolytic capacitor of the present embodiment includes plural capacitor elements of Embodiment 1 shown in FIG. 1 which are joined at respective cathode portions of the elements with an electrically conductive adhesive 9. The capacitor elements are then enclosed in a case 6 by resin molding or the like. An anode portion of each capacitor element has a zinc layer 7 provided on a end surface 1B of a valve metal (aluminum) porous foil 101. A nickel layer 8 is provided on the zinc layer 7. The zinc layer 7 and the nickel layer 8 may be provided on all or some of the aluminum foils 101 of the capacitor elements.

A copper foil 5 may be inserted in electrically-conductive adhesive layer 9. The copper foil 5 has an end portion 5A extending outwardly as a negative electrode from the case 6. Plural copper foils 5 may be inserted in the electrically-conductive adhesive layers 9 between capacitor elements. This arrangement provides the solid electrolytic capacitor of the present embodiment with a small equivalent series resistance (ESR).

Then, the capacitor elements are immersed in palladium solution for electroless plating to absorb palladium having a catalytic effect. The capacitor elements are then immersed in nickel plating solution containing phosphor, hence providing a nickel layer 10 having a 5 μm thickness and 6 wt. % of phosphor deposited on each end surface of the case 6. Then, a tin layer 13 is provided on the nickel layer 10, thus providing the solid electrolytic capacitor having a chip form. The nickel layers 10 and the tin layers 13 function as electrodes for connecting the solid electrolytic capacitor with an external circuit.

The solid electrolytic capacitor of Embodiment 2 includes shorter electrodes and smaller impedance than conventional solid electrolytic capacitors, hence having a small ESR and a small ESL. Since the porous portions 2 of the capacitor elements may be thick in the aluminum foils 101, the solid electrolytic capacitor of Embodiment 2 has a small overall size, a large capacitance, and an improved operational reliability.

Examples 8 to 10 of the chip solid electrolytic capacitor of Embodiment 2 includes the capacitor elements were fabricated and measured in their capacitances and ESRs. They were subjected to a heat cycle having 100 cycles in each of which an ambient temperature was changed from −40° C. to 105° C., and then the capacitances and the ESRs was measured. Comparative Example 6 of a solid electrolytic capacitor not including a zinc layer but nickel layers and tin layers was prepared and tested by the same manner as of Examples 8 to 10 for obtaining measurements of the characteristics. The measurements are shown in FIG. 4.

As shown in FIG. 4, the chip solid electrolytic capacitor including of the capacitor elements has a large capacitance, a small ESR, and n improved operational reliability.

Figure 5A:
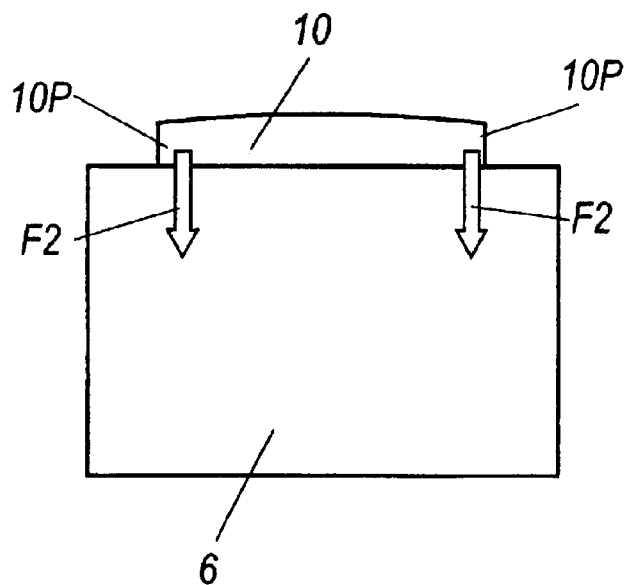
FIGS. 5A and 5B illustrate a nickel layer in the solid electrolytic capacitor according to Embodiment 2.
Figure 5B:
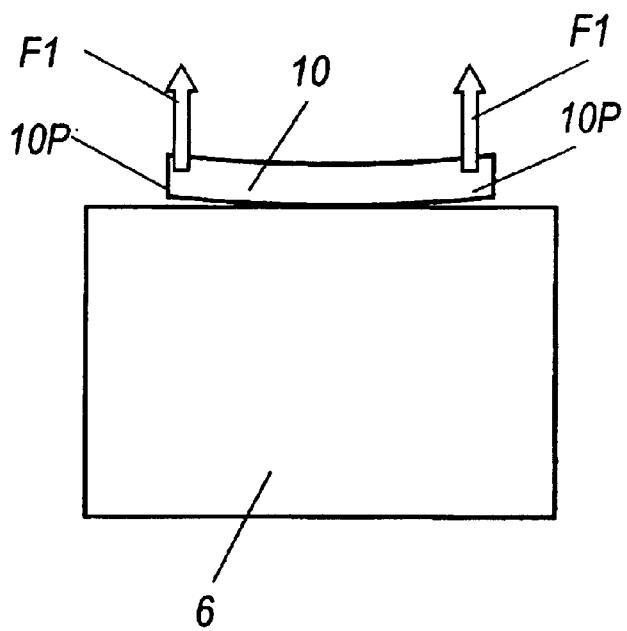

The nickel layers 10 are deposited by immersing the capacitor elements in the nickel plating solution containing phosphor. The nickel layers 10 deposited on the case are shown in FIGS. 5A and 5B. The nickel layer 10 shown in FIG. 5A receives a compression stress, that is, stress F2 for urging the edges 10P of the layer 10 towards the case 6. The nickel layer 10 shown in FIG. 5B receives a tensile stress for deflecting in a direction opposite to that shown in FIG. 5A, that is, receives stress F1 for forcing edges 10P of the layer 10 to remove from the case 6. The (tensile or compression) stress received in the nickel layer 10 can be determined by the concentration of phosphor in the nickel plating solution.

Different types of the nickel plating solution including various concentration of phosphor with additives were prepared, and the capacitor elements were immersed in the different types of solution for depositing nickel layers 10. Then, the nickel layers 10 were subjected to a tension test. According to experiment, it was confirmed that the plating solution contains a high concentration of phosphor provides the layer with the tensile stress, and the plating solution contains a small concentration of phosphor provides the layer 10 with the compression stress. The nickel layer 10 shown in FIG. 5A receiving the compression stress produces as a high bonding strength to the case 6 of 2 kg/mm². The nickel layer 10 shown in FIG. 5B receiving the tensile stress produces a bonding strength of 1 kg/mm². Thus, the bonding strength of the nickel layer 10 increases if the nickel plating solution contains the small concentration of phosphor. According to the test, the nickel layer 10 receiving an optimum compression stress if the nickel plating solution contains a concentration of phosphor ranging from 6% to 8%.

Exemplary Embodiment 3

Figure 6:
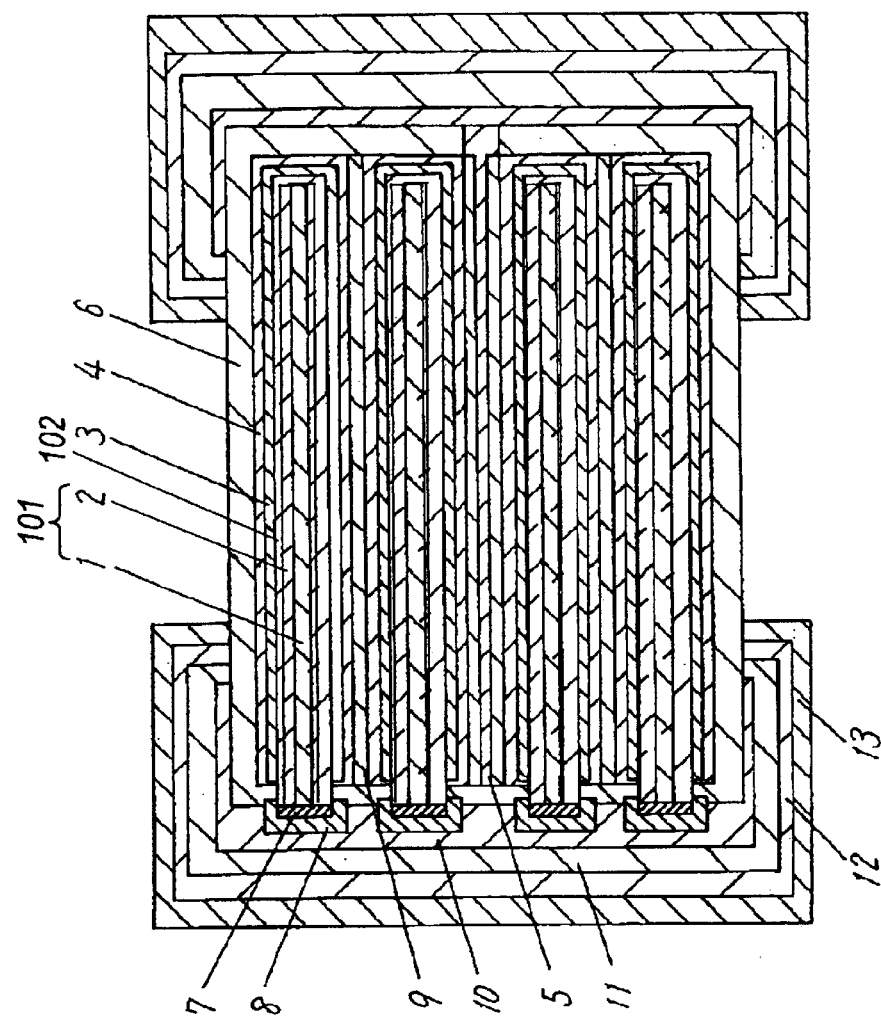
FIG. 6 is a cross sectional view of a solid electrolytic capacitor according to Exemplary Embodiment 3 of the invention.

FIG. 6 is a cross sectional view of a solid electrolytic capacitor according to Exemplary Embodiment 3 of the present invention. A solid electrolytic capacitor of Embodiment 2 shown in FIG. 3 is immersed in electrolytic copper plating solution to deposit a copper layer 11 having a thickness not smaller than 5 μm on a nickel layer 10. Then, the capacitor is immersed in electrolytic nickel plating solution for depositing a nickel layer 12 on the copper layer 11. Finally, the solid electrolytic capacitor is immersed in electrolytic tin plating solution to deposit a tin layer 13 having a thickness not smaller than 3 μm on the nickel layer 12. The nickel layer 10, the copper layer 11, the extra nickel layer 12, and the tin layer 13 function as electrodes for connecting capacitor elements to an external circuit.

The copper layer 11 has the thickness not smaller than 5 μm, hence having few defects, a small resistance, and a large physical strength.

Examples 11 to 13 of the solid electrolytic capacitor of Embodiment 3 were fabricated and measured in capacitances and ESRs. They were subjected to a heat cycle test having 100 cycle in each of which an ambient temperature was changed from −40° C. to 105° C., and then subjected to an humidity test in which they were exposed in an environment at a temperature of 85° C. and in a humidity of 85% RH for 72 hours before measurement of the ESRs. Comparative example 7 of a solid electrolytic capacitor not including the copper layer but the nickel layer and the tin layer was prepared and tested in the same manner as Examples 11 to 13 for obtaining measurements of the characteristics. The measurements are illustrated in FIG. 6.

As shown in FIG. 6, Examples 11 to 13 of the solid electrolytic capacitor of Embodiment 3 have small ESRs even after the heat cycle test.

What is claimed is:

1. A solid electrolytic capacitor comprising:
  a first capacitor element including
    a first valve metal foil including a first core layer and a first porous layer on the first core layer,
    a first dielectric layer on a portion of the first valve metal foil excluding an end portion of the first valve metal foil,
    a first solid electrolyte layer on the first dielectric layer,
    a first collector layer on the first solid electrolyte layer, and
    a first zinc layer on the end portion of the first valve metal foil;
  an insulating case for sealing the first capacitor element as to expose the first zinc layer;
  a first nickel layer on the first zinc layer; and
  a first electrode provided on the case and electrically connected to the first collector layer.

2. The solid electrolytic capacitor according to claim 1, wherein the first valve metal foil has a thickness not larger than 200 µm.

3. The solid electrolytic capacitor according to claim 1, wherein the first valve metal fall comprises aluminum.

4. The solid electrolytic capacitor according to claim 1, wherein a ratio of a cross section of the first core layer to a cross section of the first porous layer is not larger than ½.

5. The solid electrolytic capacitor according to claim 1, wherein the first electrode includes a second nickel layer provided on the case and electrically connected to the first collector layer.

6. The solid electrolytic capacitor according to claim 5, wherein the second nickel layer receives a stress for urging an edge of the second nickel layer towards the case.

7. The solid electrolytic capacitor according to claim 5, wherein the first electrode further includes a tin layer on the second nickel layer.

8. The solid electrolytic capacitor according to claim 5, wherein the first electrode further includes a solder layer on the second nickel layer.

9. The solid electrolytic capacitor according to claim 5, wherein the first electrode further includes a copper layer on the second nickel layer, a third nickel layer on the copper layer, and a tin layer provided on the third nickel layer.

10. The solid electrolytic capacitor according to claim 5, wherein the first electrode further includes a copper layer on the second nickel layer, a third nickel layer on the copper layer, and a solder layer provided on the third nickel layer.

11. The solid electrolytic capacitor according to claim 1, further comprising a second electrode provided on the case and on the first nickel layer.

12. The solid electrolytic capacitor according to claim 11, wherein the second electrode includes a second nickel layer provided on the case and electrically connected to the collector layer.

13. The solid electrolytic capacitor according to claim 12, wherein the second nickel layer receives a stress for urging an edge of the second nickel layer towards the case.

14. The solid electrolytic capacitor according to claim 12, wherein the second electrode further includes a tin layer on the second nickel layer.

15. The solid electrolytic capacitor according to claim 12, wherein the second electrode further includes a solder layer on the second nickel layer.

16. The solid electrolytic capacitor according to claim 12, wherein the second electrode further includes a copper layer on the second nickel layer, a third nickel layer on the copper layer, and a tin layer on the third nickel layer.

17. The solid electrolytic capacitor according to claim 12, wherein the second electrode further includes a copper layer on the second nickel layer, a third nickel layer on the copper layer, and a solder layer on the third nickel layer.

18. The solid electrolytic capacitor according to claim 1, further comprising:

a second capacitor element including a second valve metal toil including a second core layer and a second porous layer on the second core layer, a second dielectric layer on a portion of the second valve metal foil excluding an end portion of the second valve metal foil, a second solid electrolyte layer on the second dielectric layer, a second collector layer on the second solid electrolyte layer, and a second zinc layer on the one end of the second valve metal foil; and a second nickel layer on the second zinc layer, wherein the case encloses the first capacitor element and the second capacitor element as to expose the first zinc layer and the second zinc layer, and wherein the first electrode is electrically connected to the first collector layer and the second collector layer.

19. The solid electrolytic capacitor according to claim 18, further comprising a second electrode provided on the case and on the first and second nickel layers.

20. A method of manufacturing a solid electrolytic capacitor, comprising:

providing a dielectric layer on a valve metal porous foil;

providing a solid electrolyte layer on a portion of the dielectric layer excluding an end portion of the valve metal porous foil;

providing a collector layer on the solid electrolyte layer;

providing an case on the collector layer as to expose the portion of the dielectric layer;

immersing the portion of the dielectric layer in first solution containing zinc for zinc-substituting the portion of the dielectric layer to deposit a zinc layer on the end portion of the valve metal porous foil;

providing a nickel layer on the zinc layer;

providing a first electrode on the case, the first electrode being electrically connected to the collector layer; and providing a second electrode electrically connected to the valve metal porous foil.

21. The method according to claim 20, wherein the first solution comprises sodium hydroxide solution containing zinc.

22. The method according to claim 20, wherein the first solution comprises hydrofluoric acid containing zinc.

23. The method according to claim 20, wherein the first solution comprises ammonium fluoride solution containing zinc.

24. The method according to claim 20, wherein said providing of the nickel layer on the zinc layer comprises immersing the zinc layer in second solution containing nickel salt and boron hydride compound.

25. The method according to claim 24, wherein the boron hydride compound comprises diethyl amino volan.

* * * * *

UNITED STATES PATENT AND TRADEMARK OFFICE
CERTIFICATE OF CORRECTION

PATENT NO. : 6,909,596 B2
DATED : June 21, 2005
INVENTOR(S) : Koji Shimoyama et al.

It is certified that error appears in the above-identified patent and that said Letters Patent is hereby corrected as shown below:

Column 7,
Line 5, "fall" should read -- foil --.

Column 8,
Line 4, "toil" should read -- foil --.

Signed and Sealed this

Twenty-seventh Day of December, 2005

JON W. DUDAS
*Director of the United States Patent and Trademark Office*